(12) United States Patent
Kragh et al.

(10) Patent No.: US 8,693,281 B2
(45) Date of Patent: Apr. 8, 2014

(54) MARINE SEISMIC ACQUISITION METHOD AND SYSTEM

(75) Inventors: Julian Edward Kragh, Finchingfield (GB); Everhard Johan Muyzert, Girton (GB)

(73) Assignee: WesternGeco L.L.C., Houston, TX (US)

( * ) Notice: Subject to any disclaimer, the term of this patent is extended or adjusted under 35 U.S.C. 154(b) by 904 days.

(21) Appl. No.: 12/526,836

(22) PCT Filed: Feb. 21, 2008

(86) PCT No.: PCT/GB2008/000587
§ 371 (c)(1),
(2), (4) Date: Nov. 18, 2009

(87) PCT Pub. No.: WO2008/102134
PCT Pub. Date: Aug. 28, 2008

(65) Prior Publication Data
US 2010/0074049 A1    Mar. 25, 2010

(30) Foreign Application Priority Data

Feb. 24, 2007   (GB) .................................... 0703619.7

(51) Int. Cl.
*G01V 1/38*   (2006.01)
(52) U.S. Cl.
USPC .................... 367/16; 367/21; 367/24; 367/15
(58) Field of Classification Search
USPC ........... 367/16, 20, 22, 24, 49, 50, 51, 53, 56; 381/24, 79, 98, 99, 100, 102, 103, 111; 702/14, 17
See application file for complete search history.

(56) References Cited

U.S. PATENT DOCUMENTS

| | | | | |
|---|---|---|---|---|
| 4,353,121 A | * | 10/1982 | Ray et al. | 367/21 |
| 4,547,869 A | | 10/1985 | Savit | |
| 4,888,742 A | * | 12/1989 | Beasley | 367/53 |
| 4,992,991 A | | 2/1991 | Young et al. | |
| 4,992,992 A | | 2/1991 | Dragoset, Jr. | |
| 5,148,406 A | * | 9/1992 | Brink et al. | 367/22 |

(Continued)

FOREIGN PATENT DOCUMENTS

| | | |
|---|---|---|
| GB | 2233455 A | 1/1991 |
| GB | 2384559 B | 2/2005 |

(Continued)

OTHER PUBLICATIONS

Hill et al: "Imaging beneath basalt using an over/under towed-streamer configuration," World Oil, May 2006, pp. 1-4.

(Continued)

*Primary Examiner* — Isam Alsomiri
*Assistant Examiner* — Daniel L Murphy

(57) ABSTRACT

An elongate body for parenteral injection at low velocity from a device is described. The body has at least one pointed end and comprises at least one active material. In addition, the body has a compressive strength of greater than or equal to 5 Newton and the pointed end has an included angle of between about 10-50°. A solid vaccine formulation for needle-free parenteral delivery, methods for making the body, packaging of the body and use of the body, packaging and suitable delivery device are also described.

10 Claims, 7 Drawing Sheets

(56) References Cited

U.S. PATENT DOCUMENTS

| | | | |
|---|---|---|---|
| 5,361,381 A * | 11/1994 | Short | 381/80 |
| 6,493,636 B1 | 12/2002 | DeKok | |
| 7,328,108 B2 | 2/2008 | Robertsson et al. | |
| 7,386,397 B2 | 6/2008 | Amundsen et al. | |
| 7,391,673 B2 * | 6/2008 | Regone et al. | 367/16 |
| 7,835,224 B2 | 11/2010 | Robertsson et al. | |
| 2007/0121964 A1 * | 5/2007 | Rumreich | 381/99 |
| 2012/0075950 A1 | 3/2012 | Kragh et al. | |

FOREIGN PATENT DOCUMENTS

| | | |
|---|---|---|
| GB | 2424952 A | 10/2006 |
| WO | WO 03100461 A2 * | 12/2003 |
| WO | WO 2005019868 A1 * | 3/2005 |
| WO | 2005114258 A1 | 12/2005 |
| WO | 2007006785 A2 | 1/2007 |
| WO | 2007006785 A3 | 4/2007 |
| WO | 2008005798 A2 | 1/2008 |
| WO | 2010082126 A2 | 7/2010 |

OTHER PUBLICATIONS

Hill et al: "Over/under acquisition and data processing: the next quantum leap in seismic technology?," First Break, vol. 24, Jun. 2006, pp. 81-95.

Moldoveanu et al: "Over/under towed-streamer acquisition: A method to extend seismic bandwidth to both higher and lower frequencies," The Leading Edge, Jan. 2007, pp. 41-58.

Combined Search and Examination Report of British Application No. GB 0703619.7 dated May 3, 2007.

International Search Report of PCT Application No. PCT/GB2008/000587 dated Sep. 7, 2009.

Goto et al., "Source and receiver measurements and corrections for the effects of sea surface wave heights," Society of Exploration Geophysicists Annual Meeting, 2008: pp. 60-64.

Long et al., "A calibrated dual-sensor streamer investigation of deep target signal resolution and penetration on the NW Shelf of Australia," Society of Exploration Geophysicists Annual Meeting, 2008: pp. 428-432.

Ozdemir et al., "Robust deghosting of over/under data using noise statistics," PETEX (Petroleum Experts) Conference, London, United Kingdom, Nov. 2008: pp. 1-5.

Posthumus, "Deghosting using a twin streamer configuration," Geophysical Prospecting, 1993, vol. 41: pp. 267-286.

Robertsson et al., "Rough-sea deghosting using a single streamer and a pressure gradient approximation," Geophysics, Nov.-Dec. 2002, vol. 67(6): pp. 2005-2011.

International Search Report and Written Opinion of PCT Application No. PCT/IB2010/000073 dated Sep. 8, 2010: pp. 1-11.

* cited by examiner

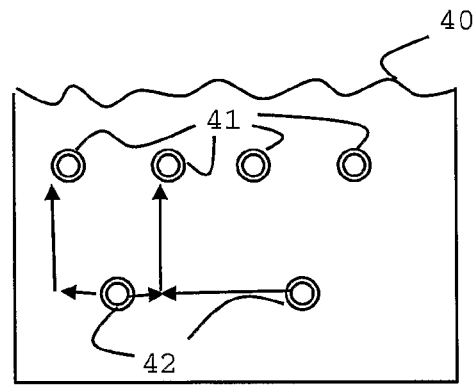
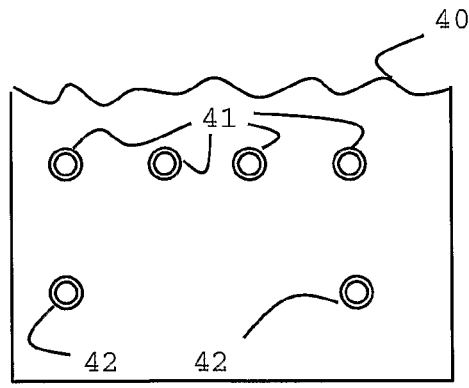
FIG. 4A    FIG. 4B
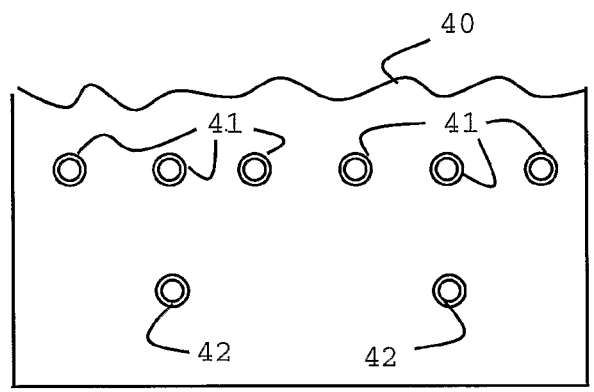
FIG. 4C
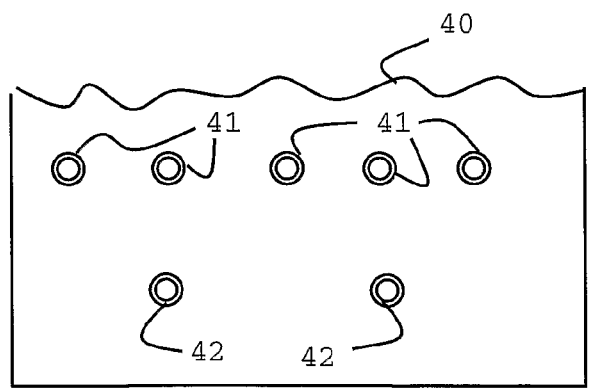
FIG. 4D

MARINE SEISMIC ACQUISITION METHOD AND SYSTEM

The present invention relates to a method and a system of acquiring and processing signals emitted from one or more sources and recorded by receivers towed through a body of water in at least two different depths.

BACKGROUND OF THE INVENTION

In a typical marine seismic acquisition, a vessel tows a source array and several receiver arrays commonly referred to as "streamers". In a conventional towed-streamer marine acquisition configuration, shallow sources and shallow cables increase the high-frequency content of the seismic data needed for resolution. However, shallow sources and shallow cables attenuate the low frequencies, which are necessary for stratigraphic and structural inversion, and for imaging deep objectives.

Towing shallow also makes the data more susceptible to environmental noise. In contrast, deep sources and deep streamers enhance the low frequencies, but attenuate the high frequencies. In addition, the data recorded via a deep tow have a higher signal-to-noise ratio (S/N) due to the more benign towing environment. A conventional towed-streamer survey design therefore, attempts to balance these conflicting aspects to arrive at a tow depth for the sources and cables that optimizes the bandwidth and signal-to-noise ratio of the data for a specific target depth or two-way travel time, often at the expense of other shallower or deeper objectives.

An over/under, towed-streamer configuration is a method of acquiring seismic data where cables are typically towed in pairs at two different cable depths, with one cable vertically above the other. The depths of these paired cables are typically significantly deeper than would be used for a conventional towed-streamer configuration.

In conjunction with these paired cables, it is possible to acquire data with paired sources at two differing source depths.

The seismic data recorded by the over/under towed-streamer configuration are combined in data processing into a single dataset that has the high-frequency characteristics of conventional data recorded at a shallow towing depth and the low frequency characteristics of conventional data recorded at a deeper towing depth. This combination process is commonly referred to in the geophysical literature as deghosting, as it effectively removes the so-called ghost notches from the receiver response.

The sea surface ghost is an important phenomenon that determines the signal-to-noise ratio of marine seismic data. Due to the negative sea surface reflection, a ghost "notch" manifests itself in the seismic response spectrum at specific frequencies where there is a destructive interference of the oppositely travelling wavefields. At normal incidence (vertically travelling waves) the ghost notch frequency is given by:

$$f_{notch} = nc/2h, \quad [1]$$

where integer $n \geq 0$, h is the streamer depth and c the water velocity. Of particular importance is the zeroth ghost notch at 0 Hz.

Over-under acquisition overcomes this problem for higher (n>0) ghost notches by adding the signals recorded by streamers at different depths with each other. In that way signal recorded fill the ghost notch of the over streamer and vice versa.

The interference spectrum of the upgoing and downgoing wavefield includes ghost maxima at frequencies of constructive interference between the up- and downgoing wavefield. The interference or ghost response spectrum reaches such maxima at the mid-frequency between two neighboring ghost notches The above process is described in greater detail by:

Hill, David; Combee, Leendert; Bacon, John in: "Over/under acquisition and data processing: the next quantum leap in seismic technology?" First Break Vol. 24, June 2006, pp 81-95.

Other references to over/under seismic acquisition methods can be found for example in the U.S. Pat. Nos. 4,992,991 and 6,493,636, both of which describe over/under streamer configuration with a different numbers of streamers at different depth levels.

A significant disadvantage of conventional over/under acquisition methods is that it requires twice the number of streamers compared to a conventional shallow towed acquisition. The economics of a 3D over-under survey thus compares unfavorably with a conventional 3D survey. Given that a vessel's capacity of towing streamers is fixed, the width of the spread is necessarily halved resulting in a doubling of the number of sail-lines.

SUMMARY OF THE INVENTION

The invention describes novel variants for conducting marine geophysical survey in an over/under receiver geometry and novel methods to generate geophysical data sets representing the reflection of geophysical signals from subterranean features.

Hence, according to a first aspect of the invention there is provided a method of performing a geophysical survey, comprising the moving of receivers through a body of water in at least two different depths and using said receivers to record within a survey frequency bandwidth geophysical signals as reflected from subterranean features, wherein a first depth is chosen such that the upper limit of the practical survey bandwidth is closer to the first ghost notch than to the second ghost notch in the spectral response at the first depth and a second depth is chosen such that the frequency of the first maximum in a spectral response at the second depth is 90 percent or less of the frequency of a first maximum in a spectral response at the first depth and the wavefield is effectively sampled at a lower density at the second depth than at the first depth.

The spectral response or response as referred to herein is the depth dependent spectrum of an up-going plane wave with vertical incidence interfering with the down-going wavefield as reflected from the sea-surface or any equivalent thereof. This spectral response is based on the constructive and destructive interference of the up- and downgoing wavefield at the depth in question. Incidence angles other than vertical can be considered without changing the basic shape of the response spectrum. As a purely physical phenomenon the spectral response is depth-dependent but independent on the specific design of any receiver or receiver cable towed at that depth. With the knowledge of the depth of a streamer and the frequency of the signals, the spectral response can be easily calculated.

The ghost notches of the spectral response at a given depth are numbered in the sequence of appearance in the spectrum with the zeroth ghost notch being at zero frequency, the first ghost notch at some frequency f1 and higher ghost notches at multiples of f1. For example, the second ghost notch is located at two times f1. The maxima of the spectral response are located at the mid-frequency between the notches. The first maxima of the response is found for example at the mid-frequency between 0 and f1, i.e. at f1/2.

The number of active receivers or receivers used at the second depth is preferably lower than the number of active receivers or receivers used at the first depth. The density does not have to be a volume density. It can equally be an area density, e.g. the number of active receivers with a given streamer or shot line spread. In the case of a dual streamer over/under configuration for a 2D survey the density can be interpreted as a line density of active receivers.

And according to a second aspect of the invention, there is provided a method of generating a marine geophysical data set representing signals reflected from subterranean features, the signals having a survey bandwidth, wherein with the survey bandwidth there is one cross-over or transition frequency below which the data set is based on receiver signals obtained from a second depth and receiver signals obtained from a first depth are muted and above which the data set is based on receiver signals obtained from the first depth and receiver signals obtained from second depth are muted.

The term "muted" refers to any process, such as filtering or attenuating, causing the signals in the muted frequency range to be essentially ignored or absent from the further processing.

For practical purposes the cross-over or transition frequency is likely to be a narrow band of frequencies centered on a nominal transition frequency. However it is important to note that there is only one such transition frequency within the survey bandwidth.

The survey bandwidth or practical survey bandwidth is the spectrum of the used or usable signals as either registered by the receivers or signals that, even though registered at a higher bandwidth, are filtered at a later stage to bandlimit the registered data for processing purposes, i.e., to generate an image of the earth. Hence, the complexity of the seismic processing chain allows for a muting of data beyond a practical bandwidth at different stages. For the purpose of this invention the survey bandwidth is typically larger than 80 Hz and more preferably larger than 100 Hz.

These and further aspects of the invention are described in detail in the following examples and accompanying drawings.

BRIEF DESCRIPTION OF THE DRAWINGS

The invention will now be described, by way of example only, with reference to the accompanying drawings, of which.

DETAILED DESCRIPTION

The invention is described in the following using FIG. 1A to illustrated a conventional over/under (O/U) survey and FIG. 1B to illustrate aspects of an example of the novel O/U survey.

Figure 1A:
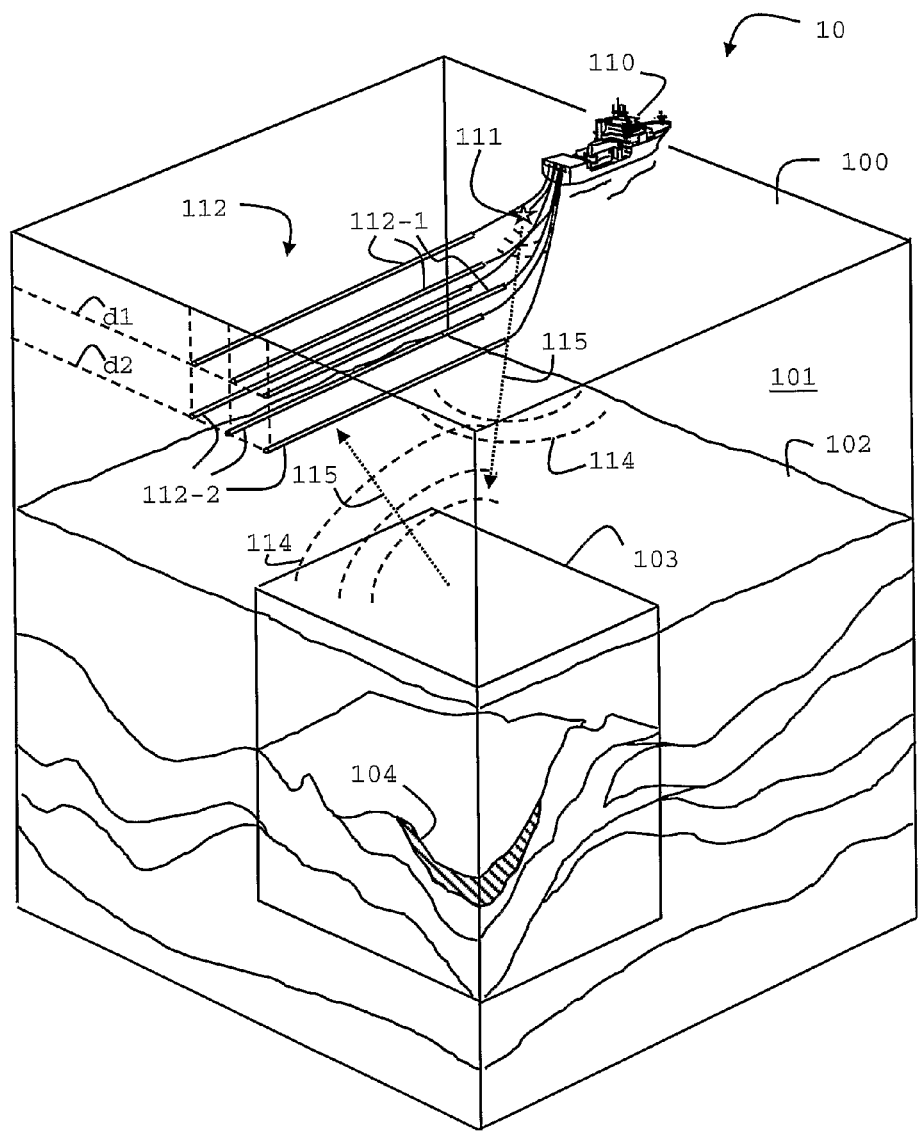
FIG. 1A illustrates an example of a known over/under marine seismic survey.

In a conventional O/U marine geophysical survey as shown by the volume of earth 10 in FIG. 1A, it is assumed that beneath a body or water 101 and the seafloor 102 there is a subterranean section of geological interest. In the present example a potential hydrocarbon trap is marked as hashed region 104.

A geophysical survey aims at illuminating this subterranean section 103 to provide a accurate representation, thus enabling the planning and control of subsequent steps of hydrocarbon exploration and production.

In the present example a vessel 110 is shown towing a geophysical source 111 and six lines 112 or streamers of marine receivers. In the example, of the six streamers 112, three streamers 112-1 are towed at a first depth d1 and the remaining 112-2 are towed at a deeper depth d2. The group of streamers 112-1 are the over (O) streamers. The group of streamers 112-2 are the under (U) streamers. As FIG. 1A is meant to illustrate a conventional O/U arrangement, the O/U streamers are shown as pairs, which are towed in parallel in a plane vertical to the sea surface 100.

For the purpose of understanding certain aspects of the present invention better, it is important to note that in conventional over/under arrangements most of the steering capabilities are dedicated to keeping these (over/under) pairs of streamers to within a specified lateral tolerance of each other, leaving thus less steering capability for accurate absolute positioning.

The wave nature of the signal emitted by the source 111 and recorded by the receivers in the streamers 112 is illustrated through the use of dashed lines 114 and the propagation direction by the arrows 115. The part of the wavefield thus indicated travels from the source penetrating the seafloor 102 and deeper to reach the section of interest 103. At each impedance change, part of the emitted signal is reflected and travels into an upward direction. This upwards traveling wavefield is sampled by the receivers in the lines 112.

Typically the source 111 used in the survey of FIG. 1A is a conventional seismic source or source array generating a low-frequency acoustic wave. However, the principle of the present invention would not change, if the source is based on a different geophysical wave mechanism such as marine vibratory sources.

Figure 1B:
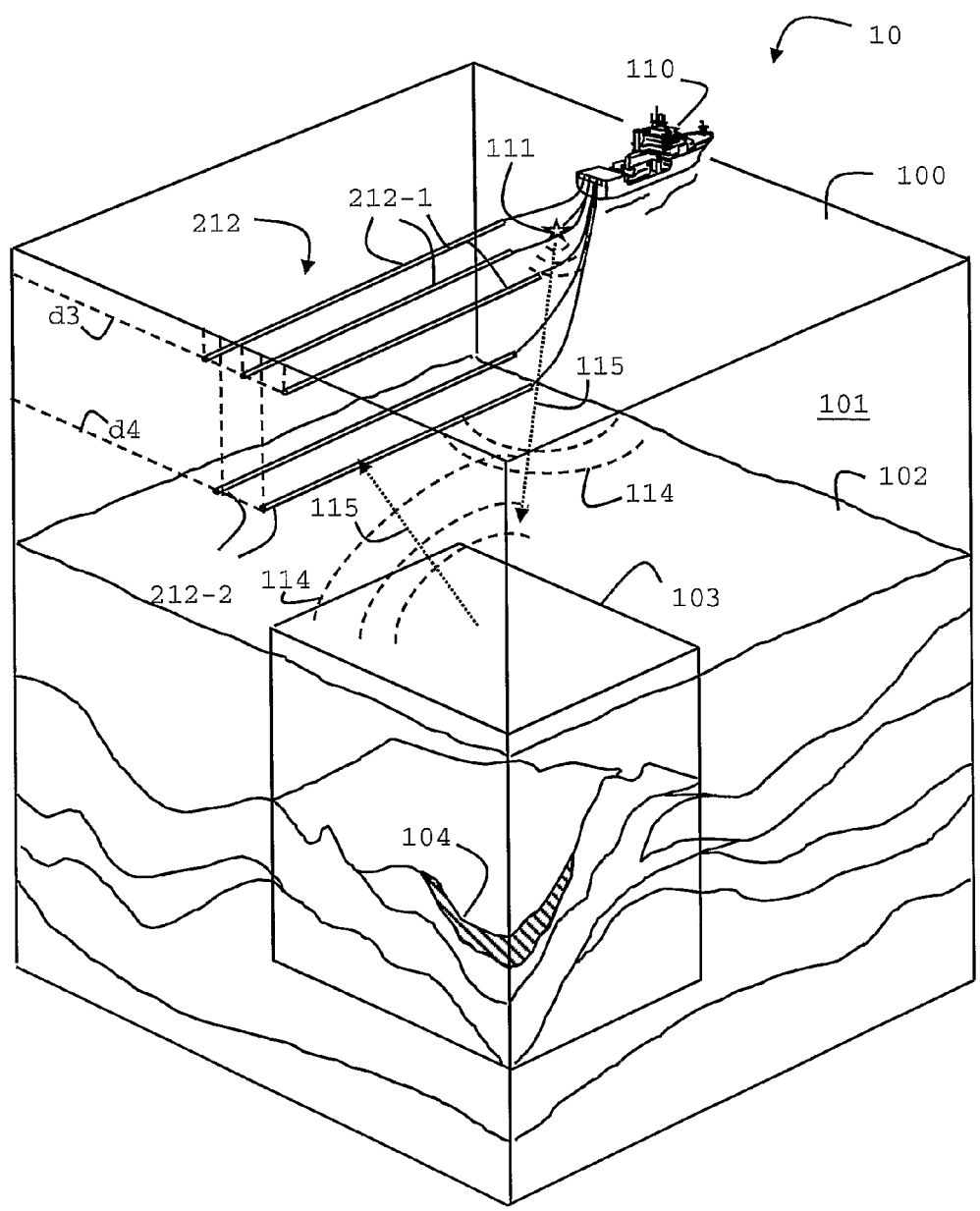
FIG. 1B illustrates an example of an over/under marine seismic survey in accordance with the invention.
Figure 2A:
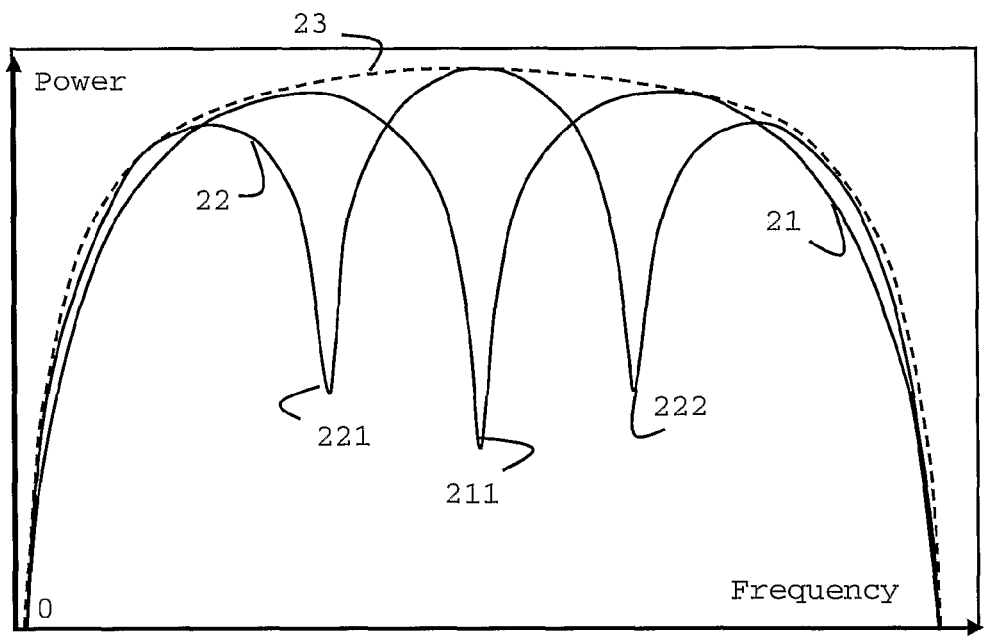
FIG. 2A illustrates a spectral response function for a known over/under marine seismic survey.

Further details as to the receiver response in the case of a conventional survey as shown in FIG. 1A will be illustrated in FIG. 2A. However, before looking at those details, it is instructive to see how a survey as proposed by the present invention differs from the above example. An example of an O/U survey in accordance with the present invention is therefore shown in the FIG. 1B.

In FIG. 1B, elements other than the streamer arrangements are identical to the example of FIG. 1A and are hence denoted by the same numerals.

The new streamer arrangement 212 is shown to include three over streamers 212-1 and only two under streamers 212-2. Not only is the lower number of U streamers compared to the example of FIG. 1A significant for a full appreciation of the scope of the present invention, it is also worth pointing out that the O/U streamers are no longer paired in a vertical plane and pulled parallel to one another. As such, non-paired arrangements different from the present have been proposed in the above-cited U.S. Pat. Nos. 4,992,991 and 6,493,636.

Apart from being no longer towed in pairs, the O/U arrangement of the present invention bears other distinctive elements. The respective depths d3 and d4 at which the over streamer 212-1 and under streamers 212-2 are towed are different from the conventional O/U configuration. In general, d3 is chosen according to the invention to be more shallow than the corresponding d1 of the conventional case of FIG. 1A. And the difference between d3 and d4 is taken to be larger than in the case of d1 and d2.

Figure 2B:
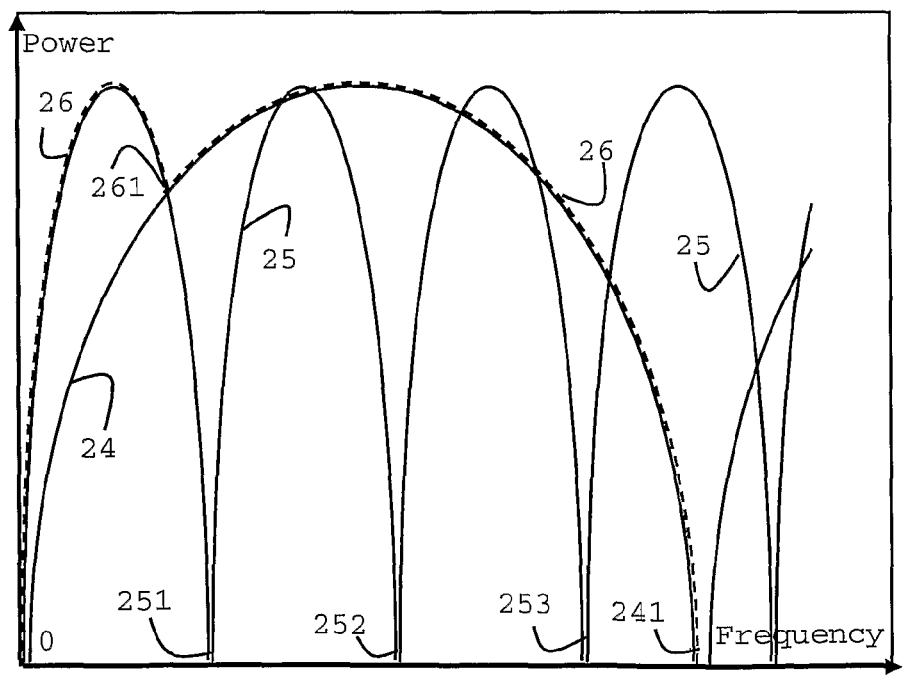
FIG. 2B illustrates a spectral response function for an over/under marine seismic survey in accordance with the invention.

The significance of these differences will be further illustrated in FIG. 2 which shows conceptually the spectral response for a pair of O/U streamers such as the streamers 112-1 and 112-2 of FIG. 1A in FIG. 2A, and, in FIG. 2B, the equivalent response spectrum for one over and one under streamer as, for example, expected from the streamers 212-1 and 212-2 of FIG. 1B. The responses include the vertical incidence of a plane wave with the reflection from the sea surface. These spectra are examples only and can be easily extended to cases of non-vertical incidence.

Looking first at the conventional response as shown in FIG. 2A, the two streamers are assumed to be at 15.0 m depth resulting in response curve 21 and at 22.5 m depth with a response 22. The response curve 21 of the shallow streamer has a notch 211 at 50 Hz within the bandwidth of the survey. The bandwidth of the survey is >0 to 100 Hz. The response curve 22 of the shallow streamer has two notches 221, 222 at 33 Hz and 66 Hz within this bandwidth.

The conventional over/under processing of streamer signals leads to an effective response curve 23, which is essentially the average of the two response curves over the bandwidth of the survey. The effective response curve 23 is shown as dashed line. As a result of the O/U combination the effects of the ghost notches are cancelled from the receiver response thus amounting to a deghosting of the received geophysical signals.

Regarding the response in the case of streamers deployed in accordance with the present invention as shown in FIG. 2B, some differences are evident. The response 24 of the shallow streamer assumed to be towed at 5 m depth, has its first notch 241 in the region of the upper limit of the survey bandwidth at 150 Hz. The response 25 of the second receiver cable, which is towed at 18 m depth, shows three notches 251, 252, 253 within the survey bandwidth at around 42, 84 and 126 Hz, respectively.

In accordance with an aspect of the present invention the combination of the two streamer data is effected in different manner than done in the conventional O/U case shown above. The present invention proposes to effectively mute signals from the shallow streamer or receiver cable from the lower limit of the bandwidth up to a transition or cross-over frequency. In the frequency interval from the transition frequency to the upper limit of the survey bandwidth the response of the deep streamer or cable is effectively muted and the response of the shallow streamer dominates the overall response of the survey. The combination of the shallow and deeper spectra can hence be carried out through simple surgical mute and replace after re-datuming to the same (arbitrary) depth. This example is illustrated as the dashed response line 26 with a cross-over point 261.

To extrapolate the signals to the same depth, e.g. the depth of the over streamer, use can be made of the fact that water is an almost homogenous medium, particularly for low frequency signals. Hence a suitable operator or filter to re-datum the signals D(d4) from a depth d4 to signals D(d3) at a depth d3 is can be for example written as:

$$D(d3)=D(d4)\exp\{-ik_z(d3-d4)\}, \quad [1]$$

where i is the imaginary unit and $k_z$ is the vertical wavenumber.

In the example of FIG. 2B, the cross-over frequency is centered around 30 Hz. In the example, it is chosen according to the condition that the responses of over and under streamer are equal. However the exact location of the cross-over frequency will in most cases be of no material relevance for the performance of the present invention and thus can be chosen with some degree of freedom within the area roughly determined by the cross-over of the respective responses.

For example, in an alternative to the above method, the cross-over frequency may be determined taking the signal-to-noise ratios (S/Ns) of the different streamers into account. For example, the signals may be weighted according to their signal-to-noise ratio such that the process of choosing the cross-over frequency automatically takes the S/N value of the recorded signals in account.

As the response 24 of the shallow streamer has the first (n=1) ghost notch at a high frequency, there is a considerable signal attenuation at low frequencies. As a result the shallow streamer has a poor signal-to-noise ratio in the low frequency part of the spectrum. On the other hand the deep streamer has a strong low frequency response (less attenuation) but has a first (n=1) ghost notch 251 at 42 Hz.

But when combining the signals as described above only the lower end of the spectrum is used from the under streamer, where it has an enhanced signal-to-noise ratio due to the ghost effect explained above and in addition because of the lower noise environment at depths further away from the sea surface. From the over streamer only the higher end of the spectrum is used. The two partial spectra are merged and further processed. No conventional up-down wavefield separation as described above in connection with FIG. 2A is applied in this example of the present invention.

Typically for marine seismic data, the lower part of spectrum is the most noisy. This is because the dominant noise source is swell-induced from the sea surface. Deep towed data are less noisy as the streamers are in a lower noise environment at depths further away from the sea surface induced noise. The above method in accordance with the present invention can thus be seen as optimally combining the low frequencies from the under streamers and the high frequencies from the over streamer resulting in a broadband dataset with the optimal signal-to-noise ratio.

Figure 3:
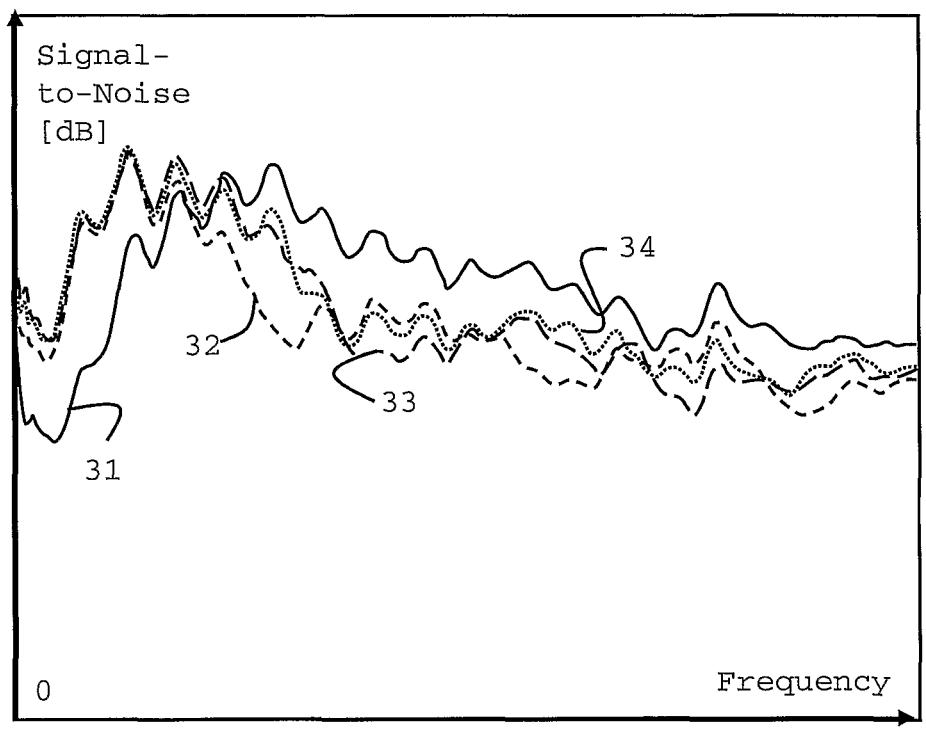
FIG. 3 illustrates signal-to-noise ratios over frequency for various cable depths.
Figure 4E:
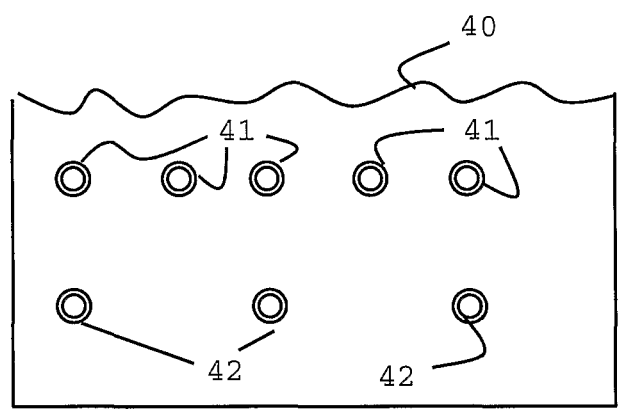
FIG. 4 shows different streamer configurations for use in accordance with aspects of the present invention.
Figure 4F:
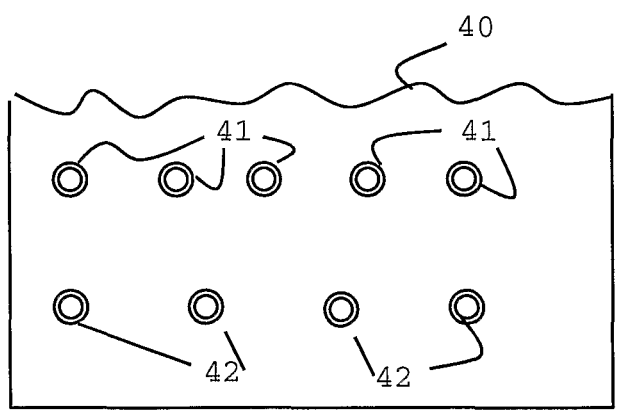

In FIG. 3 examples of the noise levels of streamer signals are shown, further illustrating advantages of the present invention over the existing O/U methods. The graph shows three signal-to-noise ratios over frequency from three streamers at three different depth levels. The solid curve 31 is taken from a streamer at 5 m depth. The short-dashed curve 32 is taken from a streamer at 23 m depth. The long-dashed curve 33 is taken from a streamer at 18 m depth. The dotted curve 34 is the signal-to-noise ratio as derived from the combined data in conventional O/U processing. By comparison, the new method has the S/N of curve 33 for the interval up to the frequency where curve 33 crosses the curve 31. From there the S/N is that of curve 31.

The comparison of the thus assembled curve 33, 31 with the curve 34 shows that the new method has an inherent advantage of generating the most favorable S/N across the full bandwidth of the survey. The 18 m curve 33 is slightly above the curve 34 in the low frequency range while curve 31 is higher than curve 34 in the remaining section of the spectrum.

Given the favorable S/N, this invention may be also used to increase the acquisition weather window because the noisy low frequency data from the over streamers are no longer required for a survey with a given bandwidth.

Different selection criteria follow from implementing an O/U survey in accordance with the present invention compared to those for a conventional O/U survey. In the latter, it is the aim to tow both streamers as deep as possible to avoid noise, and otherwise to keep the distance between the two streamers within narrow limits to ensure that the ghost notches of one is located approximately within the maximum response of the other. However, in an O/U survey in accordance with the present invention, it is first the aim to tow the over streamer as shallow as possible thus extending the bandwidth of the survey. In practice, noise consideration may dictate not to exploit the maximum possible bandwidth. As the recorded signals are essentially treated independently in any subsequent processing steps, the present invention offer a greater flexibility in choosing the depth of the under streamer in relation to the over streamer.

Ideally, the depth of the under streamer(s) is chosen such that there is a maximum gain in the combined response curve. Looking again at FIG. 2B, the depth of the under streamer(s) is selected such that the first maximum of its response curve 25 is well above the response curve 24 the over streamer(s) in the low frequency range. To make a significant impact the peak frequency of the first maximum on the under streamer should be less than 90% of the peak frequency of the first maximum of the response on the over streamer. More significant gains can be achieved by increasing the depth of the under streamer such that the peak frequency of the first maximum is less than 75% of the peak response of the over streamer. It is clear that even higher gains can be achieved by extending the depth difference between the O/U streamers such that the peak frequency of the first maximum is less than 55% or even less than 51% of the peak frequency of the over streamer.

In the example of FIG. 2B, the peak frequencies of the O/U streamer responses is found at 20 Hz and 70 Hz, respectively. Hence the peak frequency of the first maximum is in this example less than a third of the peak response of the over streamer.

Using the under streamer only for the low frequency part of the survey, gives rise to certain advantages referred to partly already in connection with FIG. 1B.

One of the most important advantages of this aspect of the invention (which comes in to practice for 3D towed spreads) is that receivers at the under level can be less densely spaced that the receivers in the over positions. FIGS. 4A-F illustrate practical consequences of this aspect with a varied number of streamers. The streamers are shown in a schematic cross-sectional view with the over streamer denoted by numeral 41 and the under streamer by numeral 42. The sea-surface 40 is shown a reference level. An under streamer can be either paired with an over streamer such that both have the same cross-line offset. In other examples, the under streamer have a cross-line offsets different from those of the over streamers. Other examples have some under streamers without and other under with cross-line offset.

The under streamers might be towed exactly vertically beneath the over streamers or in between the over streamers. For an 8 streamer configuration as shown in FIG. 4C, the extra cost (in terms of increased acquisition time) of using 6 over and 2 under streamers would be 33% increase in sail lines. Conventional over/under would require a 100% increase in sail-lines compared to 8 shallow streamers.

Before the spectra can be effectively combined interpolation/extrapolation has to be applied to the deeper streamer recordings to correct for different the cross-line and vertical recording positions. As only low frequencies, likely well below 30 Hz, are used the interpolation or extrapolation is fairly stable. The arrows in FIG. 4A indicate possible interpolation or extrapolation paths in cross-line followed by a vertical extrapolation. The operators for the interpolation or extrapolation are known per se. A simple extrapolation or interpolation in cross-line direction can be done by using the sum of the measurement at the streamers weighted by the distance to the extrapolation or interpolation point.

More advanced extrapolation or interpolation in cross-line may use polynomial or spline methods. Other suitable cross-line interpolation methods are described for example in the co-owned international published patent application WO 2005/114258 A1. It can be also contemplated to use interpolation in radial direction to interpolate directly to a different depth position having a cross-line offset with respect to the original receiver position.

The different tow depths of the over and under streamers or, equivalently, the vertical extrapolation, can be done using a redatuming operator putting the deeper streamers at the same level as the shallow streamers as shown above (see operator [1]), or the shallow streamer data to the depth level of the deep streamer or redatuming the shallow and deep streamers to at any arbitrary common reference depth.

In principle it is possible to apply the interpolation or extrapolation to the high frequency data from the over streamers. However, the drawback is that at high frequencies the shorter wavelengths make the interpolation less accurate.

In the above example the signals recorded at the two depth levels are combined at a very early stage of the seismic processing chain. Ideally the combination is done on a trace-by-trace basis prior to even stacking or binning.

Alternatively, the signals of over and under streamers can be combined at a later stage of the seismic processing chain, for example in the migration/imaging stage. Using frequency dependent migration the different frequencies of the over and under data can be migrated separately and only then combined to get a true depth image with the full content. The combining of the signals or data sets after migration hence potentially removes the need to extrapolate or interpolate to a common depth level. However, the sparse low frequency data-set will have a different midpoint distribution which has to be combined with the dense high frequency data.

A possible further variant of the invention contemplates the use of sparse conventional over/under streamers then interleaved with over streamers. The over-under pairs would have the broadest frequency range and may used for specific processing steps such as velocity analysis.

Figure 5:
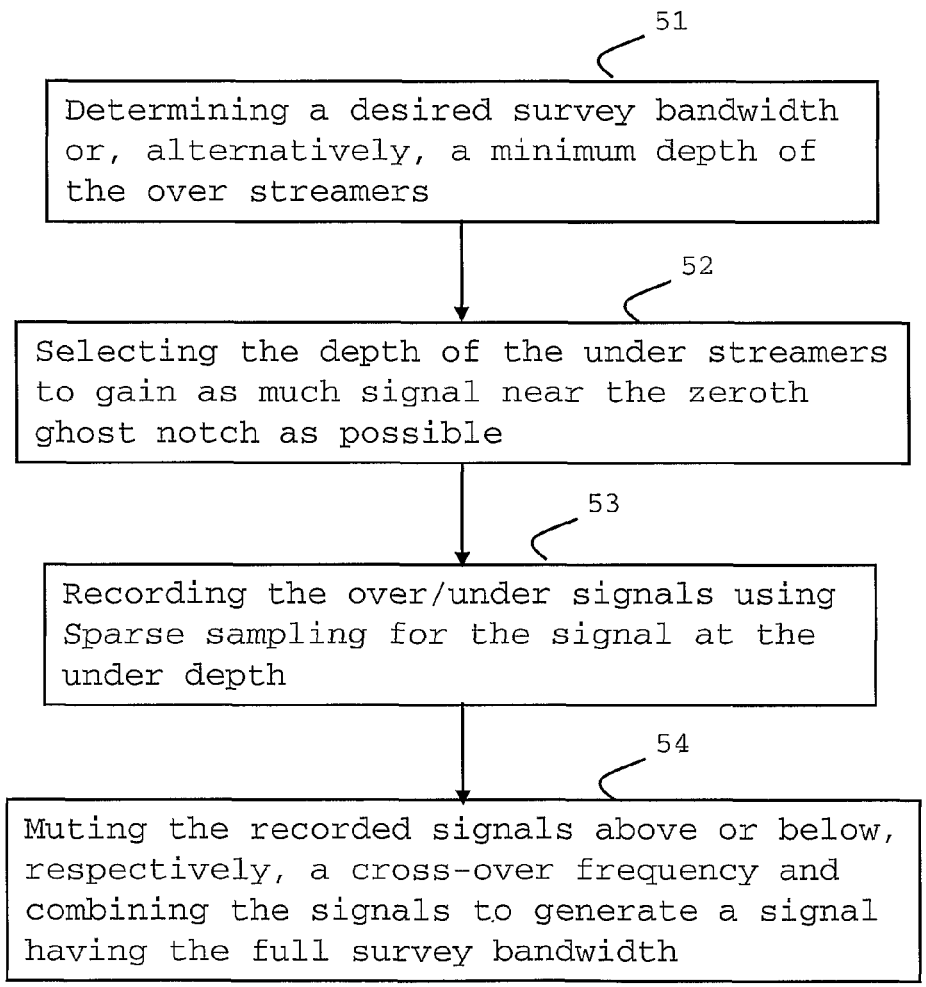
FIG. 5 shows a flowchart listing steps in accordance with n example of the present invention.

The steps of the above example are listed as a flowchart in FIG. 5. The flowchart includes the step 51 of determining a desired survey bandwidth or, alternatively, a minimum depth of the over streamer followed by the step 52 of selecting the depth of the under streamers to gain as much signal as possible within the given survey constrains near the zeroth ghost notch. The step 53 includes recording the over/under signal using sparse sampling for the signal at the under depth. The recorded signals or data are then muted above or below, respectively, a cross-over frequency and combined to a signal having the full survey bandwidth (Step 54).

The above description of examples is referred to for illustrative purposes only. Other variants and embodiments of the invention may be regarded to be well within the scope of a skilled person once afforded with the knowledge of the invention as described above.

The invention claimed is:

1. A method for performing a geophysical survey in a body of water to determine properties of subterranean features of the earth:

moving one or more seismic sources through the body of water;

activating the one or more seismic sources to generate seismic signals;

moving a plurality of receivers through the body of water at at least two different depths, the at least two different depths comprising at least a shallow depth and a deep depth, wherein the deep depth is deeper in the body of water with respect to a surface of the body of water than the shallow depth, and wherein a shallow set of the plurality of receivers are moved through the water at the shallow depth and a deep set of the plurality of receivers are moved through the water at the deep depth;

using the shallow set of receivers moved through the body of water at the shallow depth to record a shallow recorded signal set;

using the deep set of receivers moved through the body of water at the deep depth to record a deep recorded signal set;

muting all signals in the shallow recorded signal set having a frequency below a cross-over frequency to create a high frequency bandwidth;

muting all signals in the deep recorded signal set having a frequency above a cross-over frequency to create a low frequency bandwidth;

generating the geophysical data set by combining the high frequency bandwidth with the low frequency bandwidth; and using the geophysical data set to determine the properties of subterranean features of the earth.

2. The method of claim 1 wherein the cross-over frequency comprises a frequency at which a spectral response recorded at the shallow depth is essentially equal to a spectral response recorded at the deep depth.

3. The method of claim 1 wherein the cross-over frequency comprises a frequency at which a signal-to-noise ratio of a signal in the shallow recoded signal set is essentially equal to a signal-to-noise ratio of a signal in the deep recorded signal set.

4. The method of claim 1 wherein the high frequency bandwidth and the low frequency bandwidth are combined prior to stacking or binning.

5. The method of claim 1 wherein the high frequency bandwidth and the low frequency bandwidth are combined after being migrated.

6. The method of claim 1 wherein the shallow set of receivers comprises more receivers than the deep set of receivers to provide that the deep recorded signal set is recorded at a lower spatial density than the shallow recoded signal set.

7. The method of claim 1 wherein signals in the shallow recoded signal set and the deep recorded signal set are extrapolated or interpolated to a common depth.

8. The method of claim 7 wherein processing signals used for the extrapolating or the interpolating are recorded during recording of a single survey line.

9. The method of claim 1 wherein the at least two different depths comprises only two different depths.

10. The method of claim 1 wherein the cross-over frequency is below a first ghost notch of a spectral response at the deep depth.

* * * * *